United States Patent [19]

Zancaner

[11] 4,269,488
[45] May 26, 1981

[54] FLEXIBLE HINGE FOR RESILIENTLY CONNECTING THE ARMS TO THE FRONT PORTION OF SPECTACLES

[75] Inventor: Alberto Zancaner, Segusino, Italy

[73] Assignee: Filos S.a.s. Di Zancaner Alberto & Sorella, Segusino, Italy

[21] Appl. No.: 110,807

[22] Filed: Jan. 10, 1980

[30] Foreign Application Priority Data

Jan. 17, 1979 [IT] Italy .............................. 20519/79[U]

[51] Int. Cl.³ ................................................ G02C 5/16
[52] U.S. Cl. ..................................................... 351/113
[58] Field of Search ............... 351/113, 112, 111, 114, 351/126; 2/14, 426

[56] References Cited

U.S. PATENT DOCUMENTS 2,874,609  2/1959  Ducati .................................. 351/113

FOREIGN PATENT DOCUMENTS 1440364  6/1976  United Kingdom .................... 351/113

Primary Examiner—John K. Corbin
Assistant Examiner—B. W. de los Reyes
Attorney, Agent, or Firm—Bucknam and Archer

[57] ABSTRACT

A flexible hinge for resiliently connecting the arms and the front portion of a pair of spectacles is described which consists of a shaped wing, by means of suitable connecting members, to the arms, the shaped wing being provided with a housing in which a pressure cylindrical spring is housed. A lever arm is pin pivoted to the end of the wing, the lever arm being provided with a lug capable of engaging with the cylindrical spring, the lever arm being pivoted to the front portion of the spectacles pair, by means of a second pin. In this manner, the arms connected to the front portion of the spectacles pair are capable of being spread apart, by exercising a slight outwardly directed pressure.

1 Claim, 2 Drawing Figures

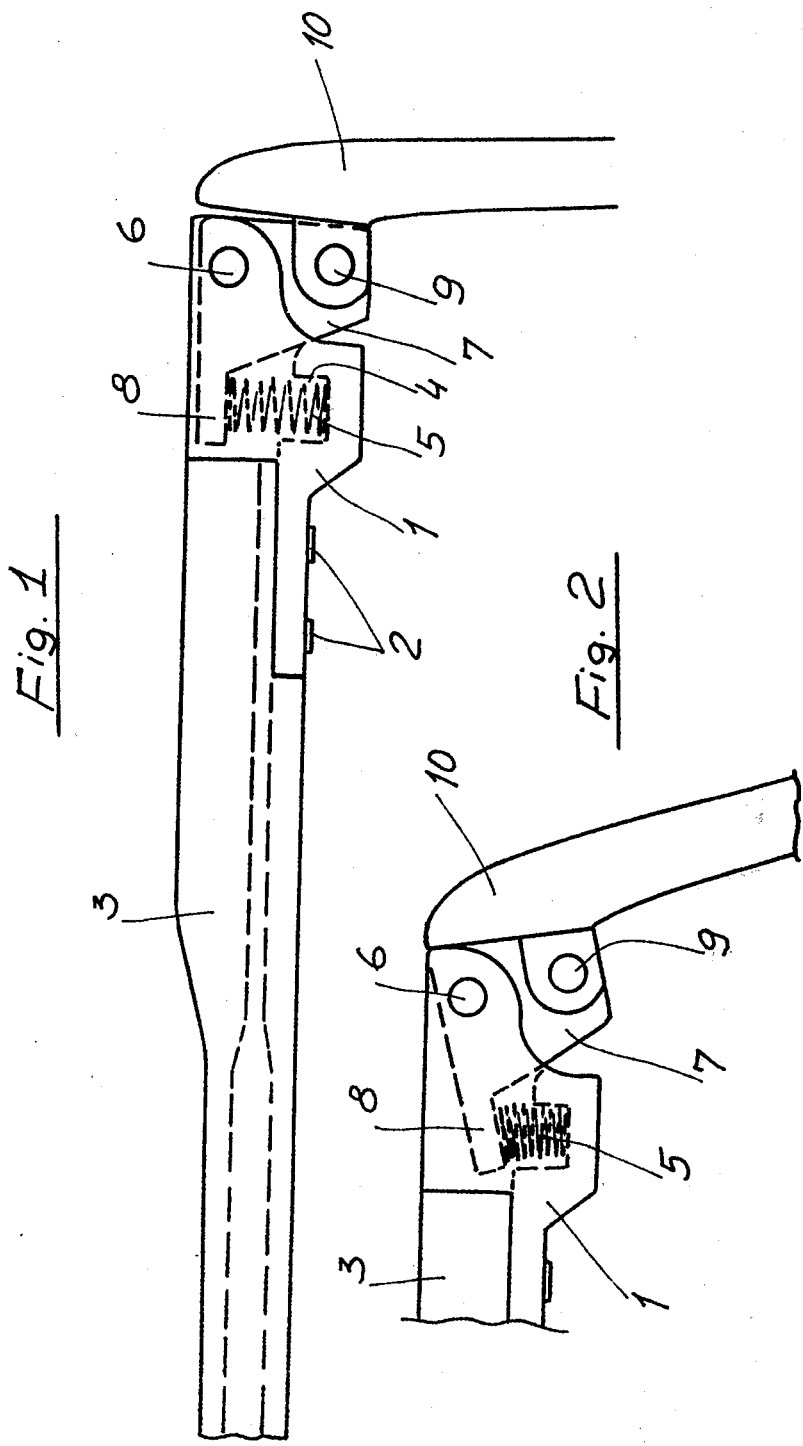

FLEXIBLE HINGE FOR RESILIENTLY CONNECTING THE ARMS TO THE FRONT PORTION OF SPECTACLES

The present invention consists of a flexible hinge effective to provide for a resilient connection between the arms and front portion of a pair of spectacles.

As it is known, a pair of spectacles consists, essentially, of two transparent means supported by a suitable frame, formed by a front portion thereto an arm pair is connected.

The connection of said arms to the front portion is carried out by means of hinges allowing for the arms to fold on said front portion as the pair of spectacles is not used.

The conventionally used spectacle hinges are however of rigid type, and they are not able of providing a suitably flexible fitting of the spectacles to the face, unless said arms are bent.

Accordingly, unless the frame is perfectly sized, said arms may exercise an excessive pressure on the user temples.

This practical drawback is, on the contrary, eliminated by using the particular flexible hinge according to the present invention.

In fact, in the instant hinge, the arms are not fixedly mounted to the front portion, but they are able of spreading apart by a few centimeters, under an outwardly directed slight pressure, and of returning to the starting position as soon as said pressure is released.

More specifically the instant spectacles hinge consists of two wings, as coupled to one another by an intermediate lever arm, counterbiassed by means of a cylindrical spring.

Due to this approach, in addition to a free rotation between the arms and front portion, it is possible to obtain a further movement of each arm with respect to the front portion.

These and other characteristics, of functional and constructional nature, of the flexible hinge, particularly for spectacles, according to the instant invention, will become more apparent from the several figures of the accompanying drawing, where:

FIG. 1 shows the instant flexible hinge as mounted between an arm and the front portion of a pair of spectacles;

FIG. 2 shows the possibility of mutually moving the wings of that same hinge.

Referring particularly to the number references of the figures of the accompanying drawing, the instant flexible hinge for resiliently connecting the arms and front portion of a pair of spectacles comprises a shaped wing (1) which is fixed to the spectacle arms (3) by means of suitable connecting members (2).

More specifically, the shaped wing is provided with a housing (4) in which a pressure cylindrical spring (5) is housed, the spring having a suitable mechanical strength.

At the outside end of the wing (1) a lever arm (7) is pivoted on a pin (6), the lever arm being provided with a lug capable of engaging the cylindrical spring.

The lever arm is pivoted, by means of the pin (9), to the front portion (10) of the spectacles, the side end of which is capable of pressing against the arm edge.

Due to this arrangement the arms (3) may be spread apart in a given way (see FIG. 2) by exercising a slight outwardly directed pressure, thereby allowing for the spectacles to be optimally fitted to the user face.

Obviously, due to the counterbiassing action by the spring (5), said arms, as the pressure is released, return to the starting position.

It should be noted that, by varying the mechanical characteristics of the spring, it is possible to increase or decrease the bending rate of the arms thereby changing the possible pressure exercised by the arms on the user temples.

From the above description and the observation of the figures of the accompanying drawing, the greater functionality and use facility characterizing the spectacles flexible hinge according to the instant Utility Model are self evident.

I claim:

1. A flexible hinge for resiliently mounting each of the arms to the front portion of a spectacle frame, which consists of a shaped wing, means for connecting said wing to said arms, said wing having a housing, a pressure cylindrical spring being located in said housing, a lever arm pivotally connected to the end of said wing by first pivot means, said lever arm being provided with a lug engageable with said spring, second pivot means for pivotally connecting said lever arm to the front portion of said spectacle frame, the side end of said front portion being capable of pressing against the arm edge, said arms spreading apart upon application of a slight outwardly directed pressure.

* * * * *